United States Patent [19]
Rowley et al.

[11] 4,134,836
[45] * Jan. 16, 1979

[54] FILTERING SYSTEM FOR SWIMMING POOLS OR THE LIKE

[75] Inventors: William N. Rowley, Palos Verdes Estates; Gordon F. Ehret, Alhambra; Robert R. Williams, San Dimas, all of Calif.

[73] Assignee: Wylain, Inc., Dallas, Tex.

[*] Notice: The portion of the term of this patent subsequent to Aug. 23, 1994, has been disclaimed.

[21] Appl. No.: 691,988

[22] Filed: Jun. 2, 1976

[51] Int. Cl.² .................................... B01D 27/04
[52] U.S. Cl. ................................ 210/232; 210/240; 210/253; 210/323 T
[58] Field of Search .............. 210/169, 240, 253, 261, 210/262, 323 T, 340, 437, 232, 345

[56] References Cited
U.S. PATENT DOCUMENTS

| | | | |
|---|---|---|---|
| 582,400 | 5/1897 | Stifel | 210/323 T X |
| 1,644,854 | 10/1927 | Oliver | 210/340 X |
| 2,390,494 | 12/1945 | Briggs et al. | 210/323 T |
| 3,149,072 | 9/1964 | Silverman | 210/240 X |
| 3,301,403 | 1/1967 | Reminder | 210/253 |
| 3,341,023 | 9/1967 | Seter | 210/323 T X |
| 3,476,252 | 11/1969 | Kudlaty | 210/323 T |
| 3,859,214 | 1/1975 | Lang et al. | 210/169 |
| 3,969,248 | 7/1976 | Whitmer | 210/340 X |
| 4,043,917 | 8/1977 | Rowley et al. | 210/323 T |

Primary Examiner—Morris O. Wolk
Assistant Examiner—Arnold Turk
Attorney, Agent, or Firm—Lane, Aitken & Ziems

[57] ABSTRACT

A filtering system in which a plurality of filter assemblies are supported in a spaced relation relative to a common header which communicates with each of the assemblies. Each filter assembly consists of a plurality of individual filter units each of which is formed by a perforated tube and a filter material extending around the tube. The fluid to be filtered is drawn through the filter units and the header for passage externally of the system.

5 Claims, 5 Drawing Figures

FILTERING SYSTEM FOR SWIMMING POOLS OR THE LIKE

BACKGROUND OF THE INVENTION

This invention relates to a filtering system and, more particularly, to such a system for continuously filtering fluid.

Filtering systems for filtering fluids, such as water for use in a swimming pool or the like, are well-known and include those types in which multiple filter elements are provided. Although these arrangements enjoy the advantage of permitting each individual filter element to be individually connected or disconnected to a header or the like for replacement, the number of individual filter elements that can be used in this manner is limited due to cost and space considerations which, of course, limits the filtering capacity of the system.

Also in these type arrangements, it is often difficult, if not impossible, to vary the filtering capacity of the system after it has been installed.

SUMMARY OF THE INVENTION

It is, therefore, an object of the present invention to provide a filtering system in which a plurality of filter assemblies are provided with each assembly consisting of a plurality of individual filter units to effect an improved filtering action.

It is a further object of the present invention to provide a filtering system of the above type in which the filter assemblies are individually connected to a common header to permit individual replacement of the units.

It is a further object of the present invention to provide a filtering system of the above type in which the individual filter assemblies extend to each side of a central header.

It is a further object of the present invention to provide a filtering system of the above type in which the filtering capacity of the system can be varied relatively easily utilizing a minimum of different parts.

It is a still further object of the present invention to provide a filtering system of the above type in which each filter assembly consists of one or more groups of filter units disposed in a stacked relationship in order to accommodate varying volumes of fluid.

Toward the fulfillment of these and other objects, the filtering system of the present invention comprises a plurality of filter assemblies each comprising at least one group of cylindrical filter units, means supporting the filter units of each group in an upright, closely-spaced relationship, and a manifold communicating with each of the filter units of each assembly; a header; means connecting the manifolds of each assembly to the header; and means associated with said header for drawing the fluid to be filtered through the filter members, the manifold and the header for passage externally of the system.

DESCRIPTION OF THE PREFERRED EMBODIMENT

Figure 1:
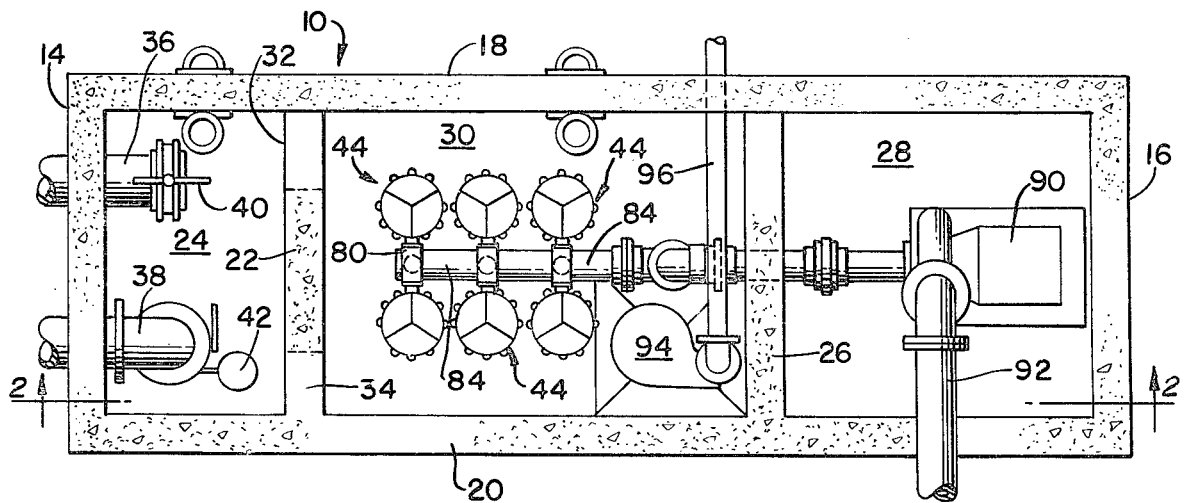
FIG. 1 is a top plan view depicting an embodiment of the filtering system of the present invention.
Figure 2:
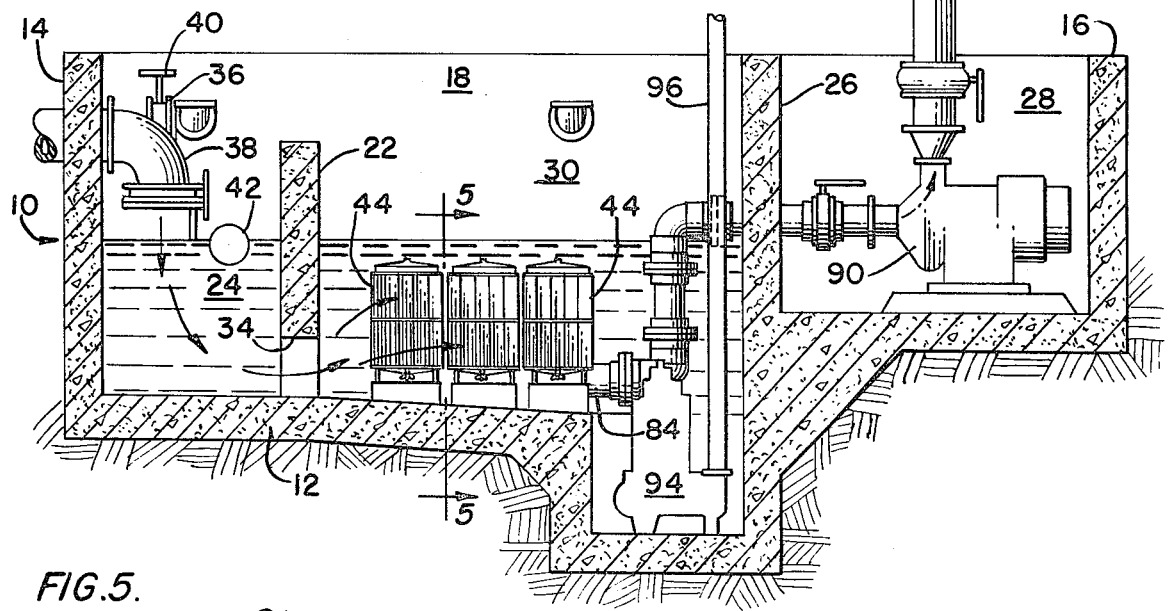
FIG. 2 is a cross-sectional view taken along the line 2—2 of FIG. 1.

The filtering system of the present invention will be described in connection with a swimming pool installation which includes a well disposed below ground level adjacent, or immediately proximate, to a swimming pool. The well is shown in general by the reference numeral 10 in FIGS. 1 and 2 and includes a floor 12, a front wall 14, a rear wall 16, and a pair of sidewalls 18 and 20. A vertical partition 22 extends between the sidewalls 18 and 20 in a spaced relation to the front wall 14 for defining a chamber 24. A vertical partition 26 extends between the sidewalls 18 and 20 in a spaced relation to the rear wall 16 for defining a chamber 28, with a chamber 30 being defined between the partitions 22 and 26. A pair of openings 32 and 34 are provided in the lower portion of the partition 22 to communicate the chambers 24 and 30.

A pair of conduits 36 and 38 are connected in an appropriate manner to receive water from the swimming pool (not shown) and discharge the water into the chamber 24. The conduit 36 has a manually operated valve 40 and is normally open during the filtering cycle for permitting a continuous discharge of water into the chamber 24, while the conduit 38 has a float valve 42 associated therewith which normally maintains the conduit closed but operates to permit selective opening of the conduit, as will be described in detail later. The unfiltered water is drawn from the chamber 24, through the openings 32 and 34 and into the chamber 30 in a manner also to be described later.

Two rows of filter assemblies 44 are disposed in the chamber 30 for filtering the water as it passes through the chamber 30.

Figure 3:
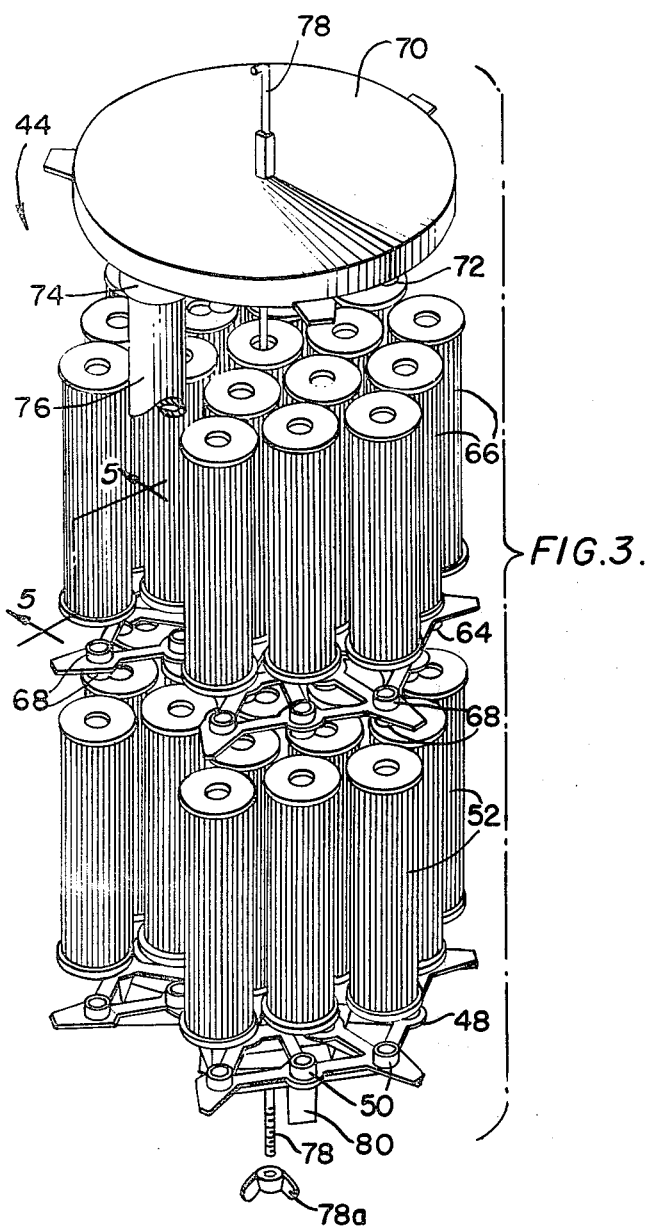
FIG. 3 is an enlarged, exploded, perspective view of a filtering apparatus utilized in the embodiment of FIGS. 1 and 2.

As shown in FIG. 3, each filter assembly 44 includes a support member 48 which is formed of a web-like structure having a plurality of nipples 50 extending from its upper and lower surfaces.

Figure 4:
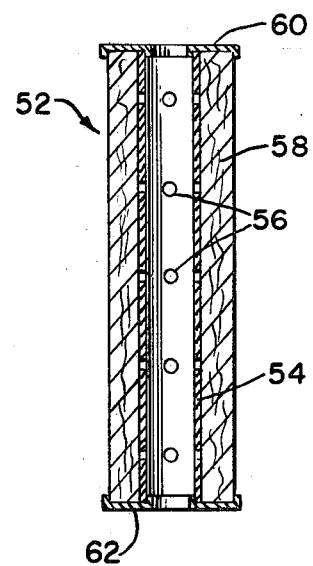
FIG. 4 is an enlarged cross-sectional view depicting a filter unit utilized in the apparatus of FIG. 3.

A plurality of upright cylindrical filter units 52 extend over the support member 48. As shown in FIG. 4, each filter unit 52 comprises a central tube 54 having a plurality of spaced perforations 56 extending along its axial length. The tube 54 is surrounded by a mesh material 58 of such construction that finely divided particles such as those found in swimming pools and other bodies of water are trapped on the exterior surface of the material rendering the use of additional filtering aids, such as diatomaceous earth or the like, unnecessary. A top plate 60 and a bottom plate 62 are located at the ends of the tube 54 and material 58 with each of the latter plates having a central opening registering with the respective ends of the tube 54.

Referring again to FIG. 3, a group of filter units 52 are mounted in a closely spaced relationship on the support member 48 with the lower end of each tube 54 registering with a nipple 50 formed on the upper surface of the support member 48.

An additional support member 64 extends between the group of filter units 52 and an additional group of filter units 66, with the support member 64 and the filter units 66 being identical to the support member 48 and the filter units 52, respectively. The support member 64 has nipples 68 formed on its upper and lower surfaces which register with the tubes 54 of the filter units 66 and the filter units 52, respectively.

A collection manifold 70 extends over the upper ends of the filter units 66 and has a plurality of nipples 72 registering with the upper ends of the tubes of the latter filter units. An outlet 74 is provided through the bottom of the collection manifold 70 and is connected to an outlet pipe 76. A tie rod 78 extends through the support members 48 and 64, a centrally located filter unit 52 and 66 and the manifold 70, and has a threaded lower end portion that is engaged by a wing nut 78a to secure these components together.

Figure 5:
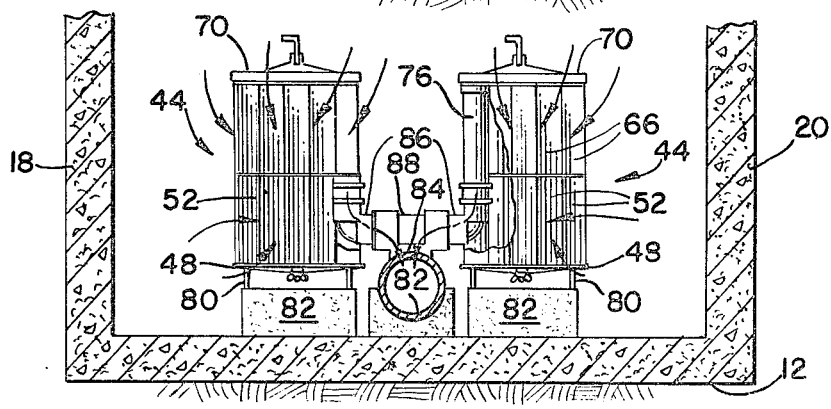
FIG. 5 is an enlarged cross-sectional view taken along the line 5—5 of FIG. 2.

Referring to FIG. 5, a plurality of support bars 80 are integrally molded to the lower surface of support member 48 to support the filter assemblies 44 relative to a plurality of mounting blocks 82 extending from the floor 12 of the well 10. A horizontal header 84 is supported on an additional mounting block 82 and extends between the two rows of filter assemblies 44.

A horizontal pipe 86 is connected to the outlet pipe 76 of each filter assembly 44, with the pipes 86 of each row of the filter assemblies 44 extending toward the header 84.

A plurality of tee connectors 88 are connected to the header 84, with each tie connector being connected to two pipes 86 extending from a pair of opposed filter assemblies 44, to communicate the manifold 70 of each filter assembly 44 with the header 84. It is understood that the connection between the tee connectors 88 and their corresponding pipes 86 can be made in any conventional manner, such as by band clamps, or the like, so that the resulting connection can be quickly released.

Referring again to FIGS. 1 and 2, the header 84 extends through the partition 26 and into the chamber 28 where it is connected to the inlet side of a suction pump 90 disposed in the chamber and adapted to discharge the water received from the header 84 externally of the well 10, via a piping system 92.

A pump 94 is provided in a recessed portion, or sump, in the chamber 30 and its outlet is connected to a pipe 96 for the purpose of evacuating the well 10.

In operation, during the filtering cycle of the swimming pool, water is passed into the chamber 24 via the conduit 36 under the force of the pressure head in the swimming pool, and is drawn through the openings 32 and 34 in the partition 22 into the chamber 30 under the action of the pump 90. The water is thus forced across the filter units 52 and 66 of the filter assemblies 44 and through the latter units into the manifolds 70 associated with each filter unit. From the manifolds 70, the filtered water passes through the outlet pipes 76, the pipes 86 and into the header 84. The filtered water then passes through the header 84 and into the inlet side of the pump 90, from which it discharges, via the piping 92, back into the swimming pool.

In the event that the water level in the chamber 24 falls below a predetermined level, the valve 42 will open the conduit 38 to permit an additional supply of water to enter the chamber 24 to thus prevent an air lock from occurring in the header 84.

In the event that one of the filter assemblies 44 requires cleaning or replacement, the pipe 86 associated with the particular assembly is uncoupled from its respective tee connector 88 and a new replacement assembly 44 is coupled to the tee connector to effect a quick and simple change. Of course, the individual filter units 52 and 66 of each filter assembly 44 can also be removed for cleaning or replacement by simply disconnecting the associated tie rods 78.

It is thus seen that the system of the present invention enables a superior filtering action to be achieved yet enables the filter units to be easily replaced with a minimum of effort and a minimum of shutdown time involved.

It also can be appreciated that the filtering capacity of the system of the present invention can be easily varied by simply adding or removing additional groups of filter units and their associated support members to and from their respective filter assemblies 44.

It is also understood that the system of the present invention is not limited to use with swimming pools but is equally applicable to other environments requiring a similar type filtering action.

Of course, variations of the specific construction and arrangement of the system disclosed above can be made by those skilled in the art without departing from the invention as defined in the appended claims.

We claim:

1. A filtering system comprising:
a chamber having an inlet opening for receiving liquid to be filtered;
a plurality of unitary filter assemblies removably positioned in said chamber, each of said unitary filter assemblies comprising a plurality of filter units adapted to be disposed in said chamber in the path of said liquid for filtering said liquid, each of said filter units comprising a perforated tube and filter means extending around said tube, said filter units being formed in a plurality of groups extending in a vertically stacked relationship, a plate-like member having a plurality of nipples extending from its upper surface and its lower surface and registering with the respective tubes of adjacent groups of filter units for supporting the groups of filter units relative to each other so that the respective tubes of the filter units of each group register with the tubes of the filter units of an adjacent group, a collection manifold having an outlet and communicating with a plurality of said filter units for receiving the filtered liquid, and means cooperating with said collection manifold and said support means for releasably securing said groups of filter units in said vertically stacked relationship;
a header disposed in said chamber;
means for connecting the outlet of each of said manifolds to said header; and
means associated with said header for drawing the liquid to be filtered through said filter units, said manifolds, and said header for passage externally of said system.

2. The system of claim 1 wherein an aperture is formed through each of said plate-like members and through each of said collection manifolds; and wherein each of said securing means comprises tie rod means extending through said apertures.

3. The system of claim 1, wherein said connecting means comprises a plurality of pipes respectively connected to said manifolds, and means for quickly releasably connecting each of said pipes to said header.

4. The system of claim 3, wherein a plurality of said unitary filter assemblies are located to each side of said header, and wherein said means for quickly releasably connecting said pipes to said header comprises a tee connector registering with said header and the pipes of two opposed filter assemblies to each side of said header.

5. A filtering system comprising:
- a chamber having an inlet opening for receiving liquid to be filtered;
- a plurality of filter assemblies disposed in said chamber in the path of said liquid; each of said filter assemblies comprising a plurality of filter units, each comprising a perforated tube and filter means extending around said tube, said filter units being formed into at least two groups extending in a vertically stacked relationship, a collection manifold having an outlet and communicating with the tubes of the uppermost group of filter units for receiving the filtered liquid, and means for supporting the groups of filter units relative to each other comprising a plate-like member having a plurality of nipples extending from its upper surface and its lower surface and registering with the respective tubes of said one group of filter units and of said adjacent group of filter units so that the respective tubes of the filter units of each group register with the tubes of the filter units of an adjacent group.
- a header disposed in said chamber;
- means for connecting the outlet of each of said manifolds to said header; and
- means associated with said header for drawing the liquid to be filtered through said filter units, said manifolds, and said header for passage externally of said system.

* * * * *